(12) United States Patent
Shpantzer et al.

(10) Patent No.: US 8,064,767 B2
(45) Date of Patent: Nov. 22, 2011

(54) OPTICAL ORTHOGONAL FREQUENCY DIVISION MULTIPLEXED COMMUNICATIONS WITH COHERENT DETECTION

(75) Inventors: Isaac Shpantzer, Bethesda, MD (US); Alexander Genusov, Brookline, MA (US); Yehouda Meiman, Rishon Letzion (IL); Jacob Khurgin, Baltimore, MD (US)

(73) Assignee: CeLight, Inc., Silver Spring, MD (US)

( * ) Notice: Subject to any disclaimer, the term of this patent is extended or adjusted under 35 U.S.C. 154(b) by 857 days.

(21) Appl. No.: 12/045,765

(22) Filed: Mar. 11, 2008

(65) Prior Publication Data

US 2008/0159758 A1 Jul. 3, 2008

Related U.S. Application Data

(63) Continuation-in-part of application No. 11/610,964, filed on Dec. 14, 2006, now Pat. No. 7,397,979, and a continuation-in-part of application No. 10/669,130, filed on Sep. 22, 2003, now Pat. No. 7,327,913, and a continuation-in-part of application No. 11/679,376, filed on Feb. 27, 2007, and a continuation-in-part of application No. 11/672,372, filed on Feb. 7, 2007, now Pat. No. 7,483,600.

(60) Provisional application No. 60/946,808, filed on Jun. 28, 2007.

(51) Int. Cl.
*H04J 14/06* (2006.01)
(52) U.S. Cl. ............... 398/65; 398/76; 398/79; 398/81; 398/147; 398/152; 398/158; 398/159; 398/184; 398/192; 398/205; 398/208
(58) Field of Classification Search .................. 398/183, 398/184, 188, 65, 75, 79, 81, 147, 152, 158, 398/159, 192, 205, 208
See application file for complete search history.

(56) References Cited

U.S. PATENT DOCUMENTS

| | | | | |
|---|---|---|---|---|
| 5,060,312 | A * | 10/1991 | Delavaux | 398/204 |
| 6,888,625 | B2 * | 5/2005 | Anderson | 356/73.1 |
| 2004/0096143 | A1 * | 5/2004 | Shpantzer et al. | 385/16 |
| 2005/0271387 | A1 * | 12/2005 | Kee et al. | 398/140 |
| 2006/0013597 | A1 * | 1/2006 | Crivelli et al. | 398/208 |
| 2006/0072922 | A1 * | 4/2006 | MacDonald et al. | 398/152 |
| 2010/0021163 | A1 * | 1/2010 | Shieh | 398/65 |

OTHER PUBLICATIONS

Authors(s): Leonid G. Kazovsky, Georgios Kalogerakis and Wei-Tao Shaw, Title: Homodyne Phase-Shift-Keying Systems; Past Challenges and Future Opportunities, Date: Dec. 2006, Publisher: Journal of Lightwave Technology, vol. 24, No. 12.*

OTHER PUBLICATIONS

Jasen: "20 Gb/s OFDM Transmission over 4,160-km SSMF Enabled by RF-Pilot Tone Phase Noise Compensation", OFC 2007, Mar. 25-29, 2007, postdeadline paper PDP15.*
Shieh: "Coherent optical orthogonal frequency division multiplexing", Electronics Letters: vol. 42., No. 10, May 11, 2006.*
Lowery: "Orthogonal-Frequency-Division Multiplexing for Optical Dispersion Compensation", OFC 2007, Mar. 25-29, 2007, paper OTuA4.*

* cited by examiner

*Primary Examiner* — Li Liu
(74) *Attorney, Agent, or Firm* — Nadya Reingand (57) ABSTRACT

The present invention provides a system and method of optical communications that utilize coherent detection technique and optical orthogonal frequency division multiplexing for phase encoded data transmission. In particular the invention addresses a device and method for digital polarization compensation of optical signals with up to 100 Gb/s transmission rate received via an optical link. The polarization compensation operates in two modes: acquisition mode and tracking mode. The polarization recovery is performed at the receiver side using the received digital signal conversion into frequency domain and separate reconstruction of the polarization state in each spectral component.

22 Claims, 6 Drawing Sheets

OPTICAL ORTHOGONAL FREQUENCY DIVISION MULTIPLEXED COMMUNICATIONS WITH COHERENT DETECTION

CROSS-REFERENCE TO RELATED APPLICATIONS

This application claims priority to U.S. provisional application 60/946,808 filed Jun. 28, 2007, and this application is a continuation-in-part of U.S. patent applications Ser. No. 11/610,964 filed Dec. 14, 2006 now U.S. Pat. No. 7,397,979, Ser. No. 10/669,130 filed Sep. 22, 2003 now U.S. Pat. No. 7,327,913, Ser. No. 11/679,376 filed Feb. 27, 2007 and Ser. No. 11/672,372 filed Feb. 7, 2007 now U.S. Pat. No. 7,483,600, all of which applications are fully incorporated herein by reference.

FIELD OF INVENTION

This invention relates generally to optical communications systems and methods that utilize coherent detection technique and optical orthogonal frequency division multiplexing. In particular the present invention addresses a method and system for digital polarization compensation of optical signals received via optical communication link. The invention discloses communication with up to 100 Gb/s transmission rate that can be implemented for various information exchange structures including video broadcasting.

BACKGROUND OF THE INVENTION

Orthogonal frequency division multiplexing is widely used technique of transmission in the RF domain where it allows mitigating of signal fading in multi-path propagation. The present invention discloses the use of orthogonal frequency division multiplexing in optical links and, in particular, in fiber communications using dual-polarization transmission.

In optical OFDM each channel the optical carrier is directly modulated by a complex RF signal that can be construed as a linear combination of M separate digitally modulated RF signals at frequencies $f_m$ such that $f_m = m/T$ where T is the period of modulation. Thus the total symbol rate of the transmitted information is M/T. In the text we shall refer to the frequencies $f_m$ as "sub-carriers".

In modern communication systems, a coherent detection technique is implemented, which provides improved sensitivity compared with traditional direct detection schematics. Typically coherent detection is used for phase-shift-keying (PSK) data transmission. The present invention is also focused on PSK, and in the preferred embodiment, QPSK (quadrature PSK) data transmission. However this does not limit the scope of the invention, and various types of data modulation can benefit from the disclosed invention.

In coherent receiver, the QPSK incoming optical signal is mixed with a strong local oscillator signal to produce in-phase (I) and in-quadrature (Q) outputs. I and Q components of the output optical signal are converted into electrical signals by a set of photodetectors. In the preferred configuration four balanced photodetectors are used to recover QPSK encoded data.

Data transmission using light of two orthogonal polarizations via the same optical channel allows doubling the data rate. At the receiver side, the optical signal is split by a polarization beam splitter, and the light of each orthogonal polarization is mixed with a local oscillator signal of the corresponding polarization in the coherent receiver.

However the orthogonality of the optical signal polarization is not preserved when the signals are transmitted via fiber link. The received optical signals neither orthogonal to each other, nor aligned with the polarization beam splitter at the receiver side. The present invention addresses this problem of the polarization state recovery in dual-polarization data transmission.

U.S. Patent Application Pub. No. 20070092259 discusses implementation of polarization compensation in the coherent optical receiver. The successful recovery of the I and Q components of the received signal is performed based on filtering using an inverse Jones matrix in combination with continuous high-speed adaptive training of the polarization compensator. In order to ease the processing, the signal is split into a number of parallel sub-streams with reduced data rate.

There is a need to develop a polarization compensation technique and method for optical orthogonal frequency division multiplexed communications.

SUMMARY OF THE INVENTION

The present invention provides a method and system for optical communications with a high traffic load. The system and method are disclosed for optical transmission with modulating an optical signal in each WDM channel by orthogonal frequency division multiplexing technique. The data is encoded using at least one of phase shift keying format, amplitude shift keying format, and frequency shift keying format.

Different aspects of the present invention may provide numerous technical advantages including significant improvements in a system performance accomplished by the transmitter and the receiver. The receiver of the present invention comprises a polarization beam splitter, at least one optical hybrid for mixing the incoming light with a local oscillator beam, a set of photodetectors to convert received signal into electrical signals, and a digital signal processing unit transforming the digital signals into frequency domain, forming a set of spectral signals each having its own digital frequency, recovering the polarization state of each spectral signal, demodulating the data encoded in each spectral signal, and outputting an information encoded in the optical beam with data.

In the preferred embodiment a coherent receiver based on 90-degrees optical hybrid is used to recover transmitted optical signal. Another embodiment implements 120-degrees optical hybrid to recover the encoded data. The optical hybrid is an integrated device made of an electro-optical material or thermo-optical material or a combination of thereof. The optical hybrid is formed as part of a single planar chip made of a semiconductor material or a ferroelectric material or a combination of thereof.

The coherent optical receiver is adapted for operation with the optical signal of two polarization states. The incoming light is split by a polarization beam splitter into a first and a second beam having two different polarization states; each beam is processed in a separate coherent receiver based on the optical hybrid. In digital signal processing unit electrical signal obtained from light of both polarization are processed together.

The recovering of the polarization state of each spectral signal operates in two modes: an acquisition mode being performed before the link starts to operate and a tracking mode being performed periodically during the receiver exploitation.

Another object of the present invention is a system for a data transmission via a WDM optical communication link. A light source generates an optical beam, which is split into a first and a second beam having two different polarization states, the first beam being encoded in a first modulator driven by a first encoding signal from an optical frequency division multiplexed encoder and the second beam is encoded in the corresponding second modulator. The encoding signal combines a set of digital spectral signals, each with different embedded data. The encoded beam is transmitted via the optical link. At the receiver side the beam is split into a first and second received beam having different polarization states. Each beam is further processed in a separate coherent receiver based on an optical hybrid. The receiver mixes the received beam with a local oscillator beam coming from a local oscillator producing a set of electrical outputs. A digital signal processing unit converts those signals into digital signals, transforms the digital signals into frequency domain, forming the set of spectral signals each having its own digital frequency, and recovers the polarization state of each spectral signal, demodulates the data encoded in each spectral signal, and outputs an information encoded in the optical beam.

Another aspect of the present invention provides a method of optical communication with polarization recovery at the receiver side using the received digital signal conversion into frequency domain and separate reconstruction of the polarization state in each spectral component.

DETAILED DESCRIPTION OF THE PREFERRED EMBODIMENT

This disclosure describes a number of embodiments of one or more optical transmission systems and elements. Within this disclosure, the term "optical" indicates electromagnetic range at or near optical frequencies; this includes visible light and so-called "near-visible" light such as near infrared, infrared, far infrared and the near and far ultra-violet spectra. The preferred operating range is around 1.5 micron.

In practical networks, the polarization recovery is required either for the data transmission using light of one polarization state or two polarization states. In the system with coherent detection, even if the light of one polarization was used, the polarization state is corrupted during the transmission, and the polarization recovery is required. The present invention addresses the polarization recovery, and it is applicable both for the data transmission in one and two polarization states of the light.

Figure 1:
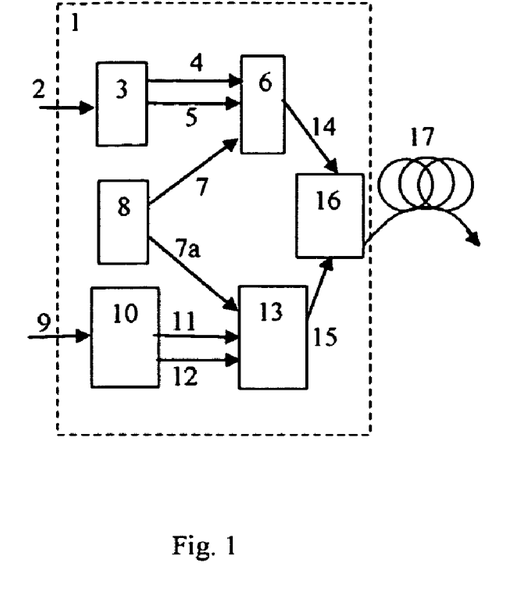
FIG. 1 A block diagram of an OFDM QPSK communications system transmitter.
Figure 2:
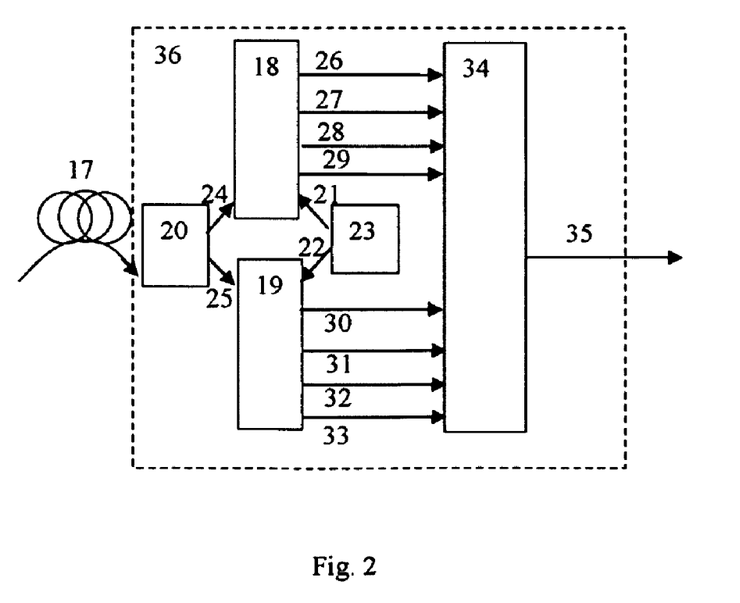
FIG. 2 A block diagram of an OFDM QPSK communications system receiver.

FIGS. 1 and 2 illustrate a point-to-point data transmission system using light of two orthogonal polarizations, where FIG. 1 depicts a transmitter and FIG. 2 shows a receiver. For the light of H-polarization, in a transmitter 1 a digital data stream 2 enters an OFDM encoder 3, which outputs two analog signals 4 and 5 (I and Q) driving an optical modulator 6. The modulator 6 embeds the modulation in a light beam 7 emitted by a light source 8. The light of V-polarization is modulated in a similar way. The data stream 9 enters an OFDM encoder 10, outputting signals 11 and 12 (I and Q), which drive an optical modulator 13. Output signals 14, 15 from the modulators 6, 13 are combined by a polarization combiner 16 and transmitted via an optical link 17 towards the receiver. FIG. 2 shows the receiving part. The signal is received by coherent receivers 18 and 19 after splitting by a polarization beam splitter 20. Local oscillator optical signals 21, 22 having H and V polarization state coming from a local oscillator light source 23 enter the coherent receivers 18 and 19 and interfere with optical signals 24, 25 having the corresponding H and V polarization states. Each of the receivers 18 and 19 includes an optical hybrid and a set of photodetectors; it will be described in more details in the following paragraphs. Each of the receivers outputs four electrical signals 26-29 and 30-33, which enter a digital signal processing unit 34. The unit 34 includes FFT transformer among other things. A polarization recovery is performed in signals of each sub-carrier frequency separately. Output signals 35 represent a series of the decoded data streams that can be displayed or transformed into any format for further presentation and use. In the preferred embodiment each of 10 data streams of 35 has a data rate of 10 Gb/s. The receiver part is labeled as unit 36 in FIG. 2.

Obviously the system can operate in bidirectional configuration with data transmission in both directions. In this case light sources, located at each end of the link, have double functions. Each light source generates the beam for the data transmission by the transmitter 1 and, at the same time, it provides the local oscillator signal for the receiver 36.

Figure 3:
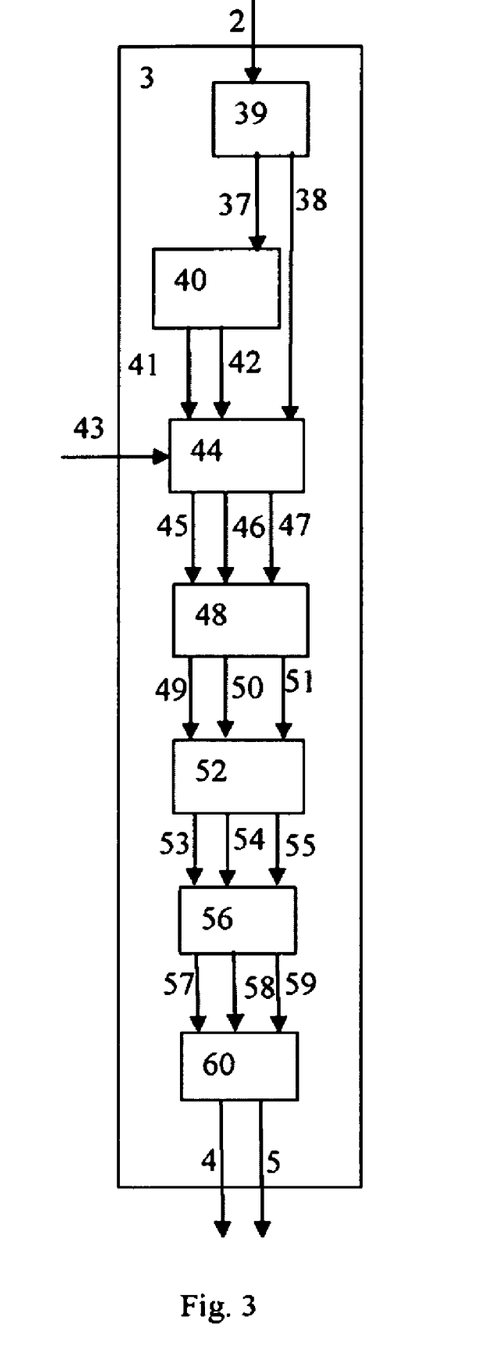
FIG. 3 A block diagram of an OFDM encoder structure.

FIG. 3 is an embodiment of the OFDM encoder 3. A serial data stream 2 is converted into parallel sub-carrier data streams 37 in a serial-to-parallel converter 39. In OFDM, the sub-carrier frequencies are chosen so that the sub-carriers are orthogonal to each other, meaning that cross-talk between the sub-carrier channels is eliminated and inter-sub-carrier guard bands are not required. Output signal 37 enters a data encoder 40, which is a QPSK data encoder in the preferred embodiment. Two output signals 41 and 42 correspond to I and Q parts of the QPSK signal. One or more sub-carrier frequencies are used as pilot tones 38 without data. The pilot tones are separated from the sub-carriers with data by a guard band used to sense the phase changes of the laser among other things. Then a preamble (or the bit sequences or codes) 43 is added in a preamble unit 44 followed by an Inverse Fast Fourier Transform in an IFFT unit 48 to the data and pilot channels. A cyclic prefix is added to the signals 49, 50 and 51 at a prefix unit 52; the cyclic prefix takes a few last symbols of each data block and repeats them at the beginning of the next block. The purpose is to make the scheme resistant to chromatic dispersion. Two sub-carriers may experience differential delay up to the length of prefix, but the orthogonality between the sub-carriers will be preserved and the data will be recovered at the receiver. Sub-carrier streams 53, 54, 55 are interleaved by a parallel-to-serial unit 56. A digital output signals 57, 58, 59 are converted to the analog signal in a D/A converter 60. The analog signals 4 and 5 (I and Q) are applied to an optical modulator 6 as shown in FIG. 1. In the preferred embodiment the modulator 6 is a MZI electro-optic modulator.

The primary advantage of OFDM over single-carrier schemes is its ability to cope with chromatic dispersion and polarization mode dispersion (PMD). Channel equalization is simplified because OFDM may be viewed as using many slowly-modulated narrowband signals rather than one one rapidly-modulated wideband signal. Low symbol rate makes the use of a guard interval between symbols affordable, making it possible to handle time-spreading and eliminate inter-symbol interference (ISI).

The main advantage of the proposed system for the long haul communications consist of its resiliency in the presence of chromatic dispersion. With each sub-channel occupying only a narrow frequency band in the vicinity of $f_c+f_m$ ($f_c$ is an optical carrier) the effect of chromatic dispersion is mitigated. Furthermore, with integration period of T one can add a guard-band equal to a certain fraction of $T-\alpha T$ (for example $\alpha=0.1$) which will allow one to tolerate much larger group delay. In essence the OFDM system with M sub-carriers operating at symbol rate B can tolerate the chromatic dispersion as a conventional system with symbol rate $B/\alpha M$.

Figure 4:
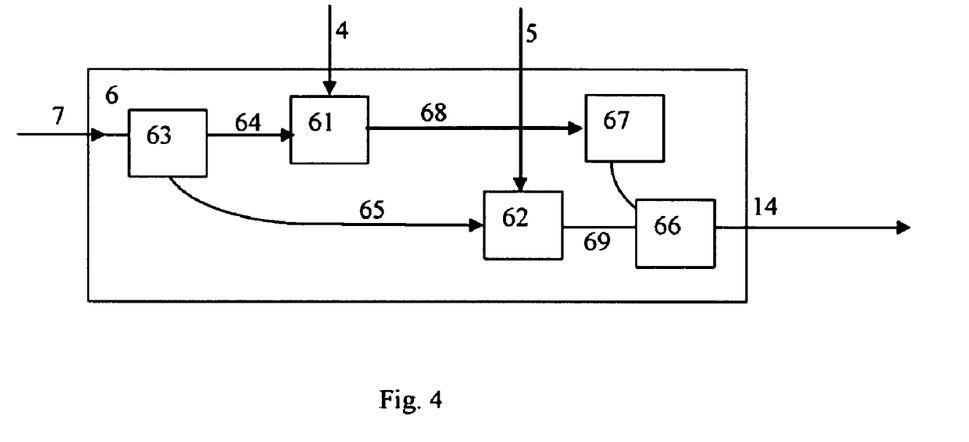
FIG. 4 A data modulator block in OFDM QPSK communications system.

In the preferred embodiment shown in FIG. 4 QPSK data is embedded in the system using two separate data modulators, which are the parts of the optical modulator 6. One modulator 61 being used for I component and another modulator 62 is for Q component of the data stream. The optical beam 7 is split by the splitter 63 into two beams 64 and 65, modulated and then combined together by the combiner 66 forming the output beam 14. A phase shift of 90-degrees is introduced by a phase shifter 67 in the beams 68 or 69. The output beam 14 is transmitted to the receiver via fiber link.

In the preferred embodiment the QPSK modulator is an integrated device as disclosed in U.S. patent applications Ser. Nos. 11/679,378 and 10/613,772 by the same inventive entity.

Figure 5:
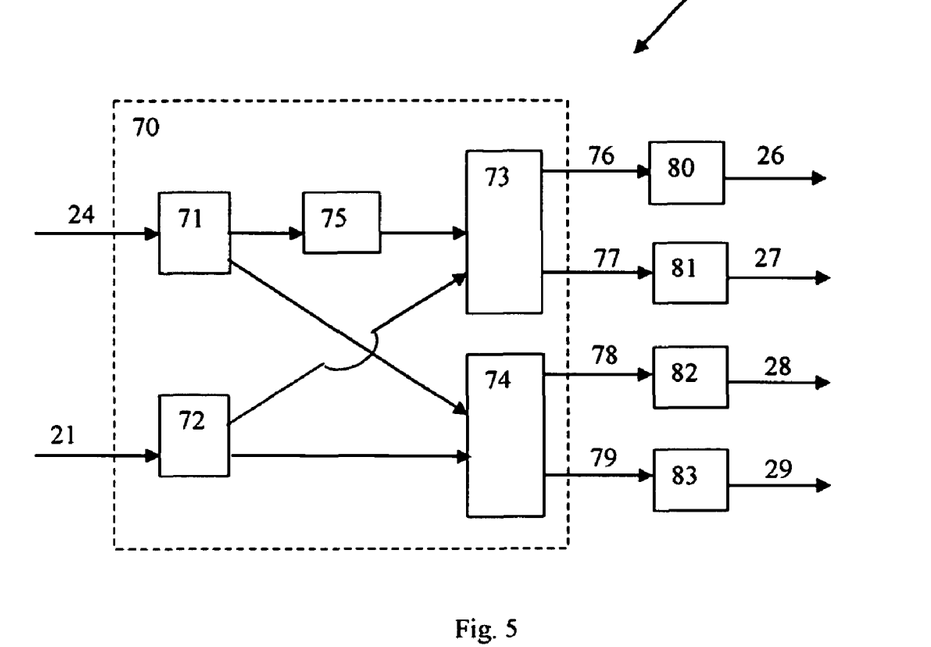
FIG. 5 A coherent optical receiver for OFDM communications system based on 90-degrees optical hybrid.
Figure 6:
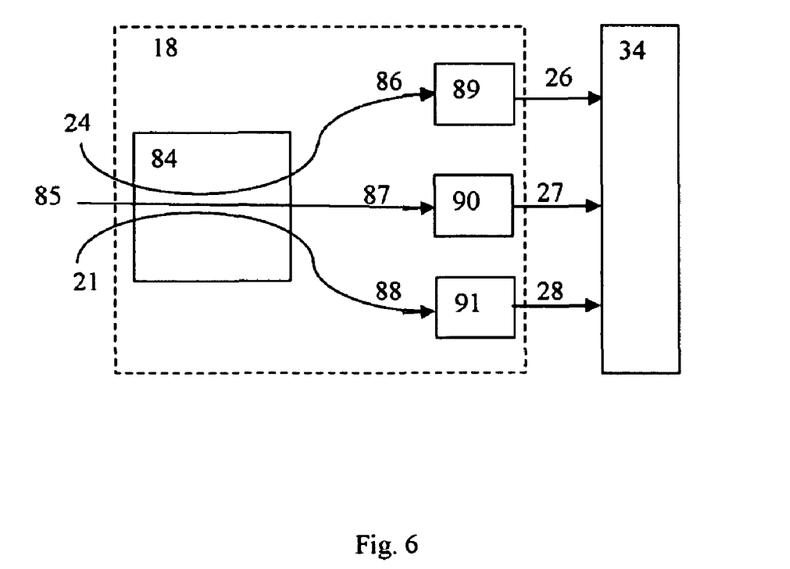
FIG. 6 A coherent optical receiver for OFDM communications system based on 120-degrees optical hybrid.

FIG. 5 and FIG. 6 illustrate two embodiment of the coherent receiver 18 to be used to recover QPSK data. In FIG. 5 the incoming signal 24 inputs 90-degrees optical hybrid 70, having four couplers 71, 72, 73, 74 and a phase shifter 75. The structure of the 90-degrees optical hybrid 70 is disclosed in details in co-pending U.S. patent application Ser. No. 11/610,964 by the same inventive entity, incorporated herein by reference. The incoming signal 24 is mixed with the local oscillator optical signal 21 producing four output optical signals 76-79. A set of four balanced photodetectors 80-83 is used to convert the signals 76-79 into electrical domain, producing outputs signals 26-29 shown in FIG. 2.

FIG. 6 depicts another embodiment of the coherent detection unit according to the present invention. This type of the detector unit is disclosed in more details in U.S. Pat. No. 4,732,447 by Wright and in U.S. Pat. No. 7,085,501 by Rickard. 120-degrees optical hybrid 84 has three inputs 24, 85, 21 and three outputs 86, 87, 88. The output signals 86-88 pass through three detector diodes 89, 90, and 91 as illustrated. In the signal processing unit 34 the electrical signals 26, 27, and 28 are split into two signal paths each. Each of these six signals is mixed with a signal from a local oscillator so as to create phase differences between said six signal paths. These six signals are combined in two groups of three so as to create an in phase and a quadrature channels. The transmitted data is recovered from the in phase and quadrature signals.

The above description of the 120-degrees optical hybrid is presented as an illustration of its possible structure and performance. Obviously various modifications can be made by a person skilled in the art. The present invention is not limited to one particular example, but comprises a variety of possible embodiments.

Figure 7:
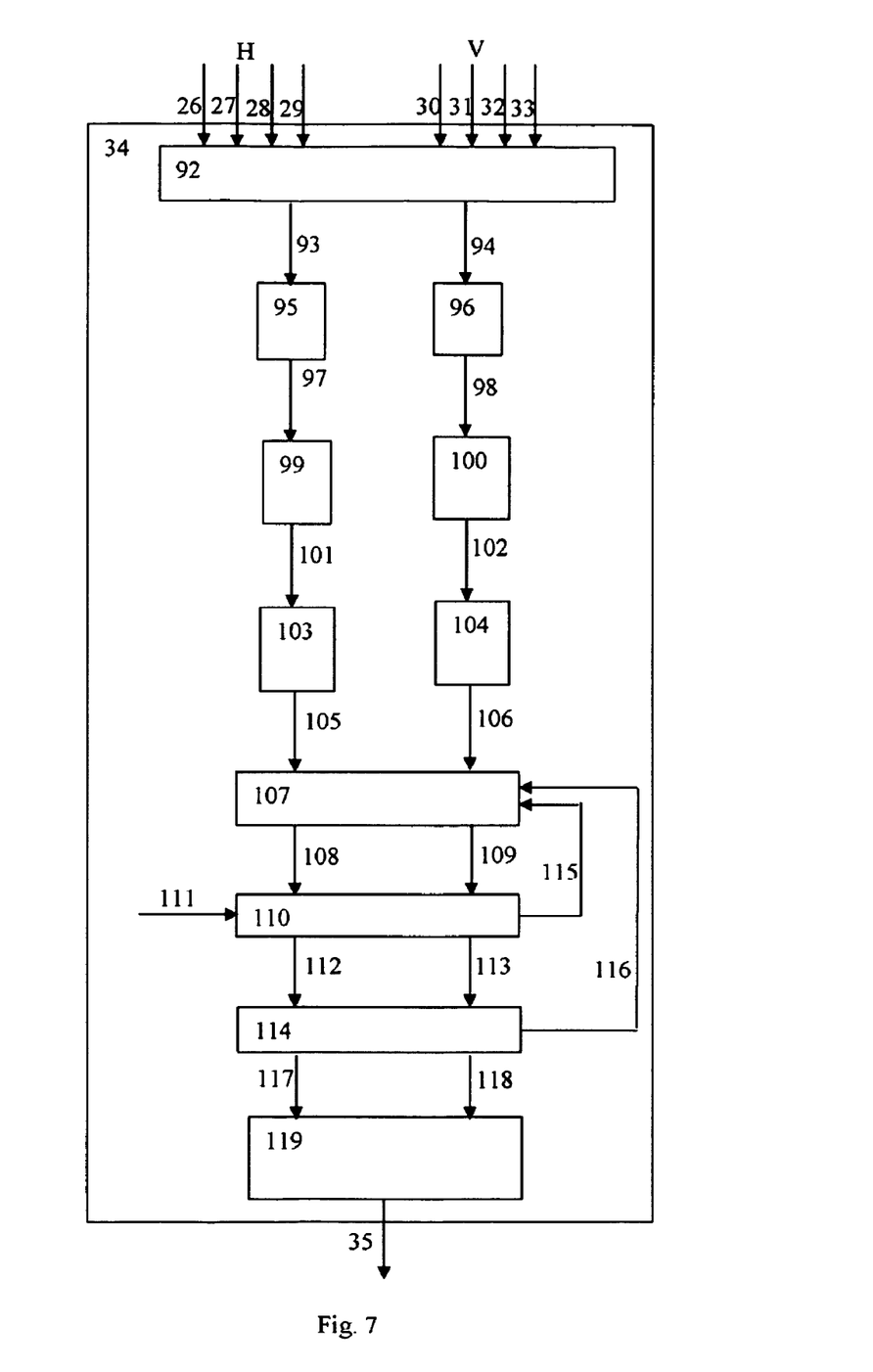
FIG. 7 A block diagram of the digital signal processing unit in OFDM communications system.

The DSP unit 34 is shown in more details in FIG. 7. The sets of signals 26-29 and 30-33 are digitized in A/D converter 92 and then split into parallel data values in serial-to-parallel units 95 and 96. The obtained signals 97, 98 are used as an input to the cyclic prefix removal blocks 99 and 100. The FFT units 103 and 104 generate the data symbol streams 105 and 106. A polarization recovery unit comprises three parts. A part 107 performs multiplication by Jones matrix, a correlation unit 110 compares received preamble with the known one 111, and tracking unit 114 performs Jones Matrix tracking. Jones Matrix used in 107 is determined by the calculations performed in units 110 and 114 and the adjustment of the matrix parameters is carried out via links 115 and 116. The data is decoded from the signals 117 and 118 in a QPSK decoding unit 119, which outputs data signal 35 for further processing or display.

It is an object of the present invention that the signal of each digital sub-carrier is processed separately for the polarization recovery. Each sub-carrier is corrupted in a different manner while transmitted via the optical link. Polarization recovery applied to each spectral sub-carrier component allows improving the system performance, to enlarge BER and enlarge the transmission distance.

A variety of algorithms can be implemented to recover the polarization. In the preferred embodiment the polarization recovery units 107-114 operates in two different modes. In the first operational mode called Jones Matrix Acquisition Mode, the unit estimates the Jones Matrix for each sub-carrier frequency. This process is done first when the link begins operation, in case of communication loss, and, to assure high quality of link periodically with a period P1, when so called "preambles" 43 in FIG. 3 are inserted in the data stream for each sub-channel at each polarization. In the preferred embodiment the preamble period P1 is within the range 10 ms-1 s, preferably about 100 ms. The preamble is a sequence of codes known in advance. When the received signal sequences of codes at each polarization are compared with the transmitted codes using the correlation operation in the correlation unit 110, the Jones Matrix can be easily determined. After the Jones Matrix is acquired, and the Tx starts transmitting actual data rather than preambles, the received signals in each sub-carrier get multiplied by the respective Jones Matrices.

In the second operational mode, the so-called Jones Matrix tracking mode, the small changes of Jones Matrices occurring over one symbol interval P2 are estimated. In the preferred embodiment P2 is from the range 1-5-ns, preferably about 5 ns. This is done by comparing received signals with the ones expected with a current Jones Matrix. The Jones matrix then gets updated by multiplying it by a small error correction signal. Then the process repeats itself during next symbol interval.

Figure 8:
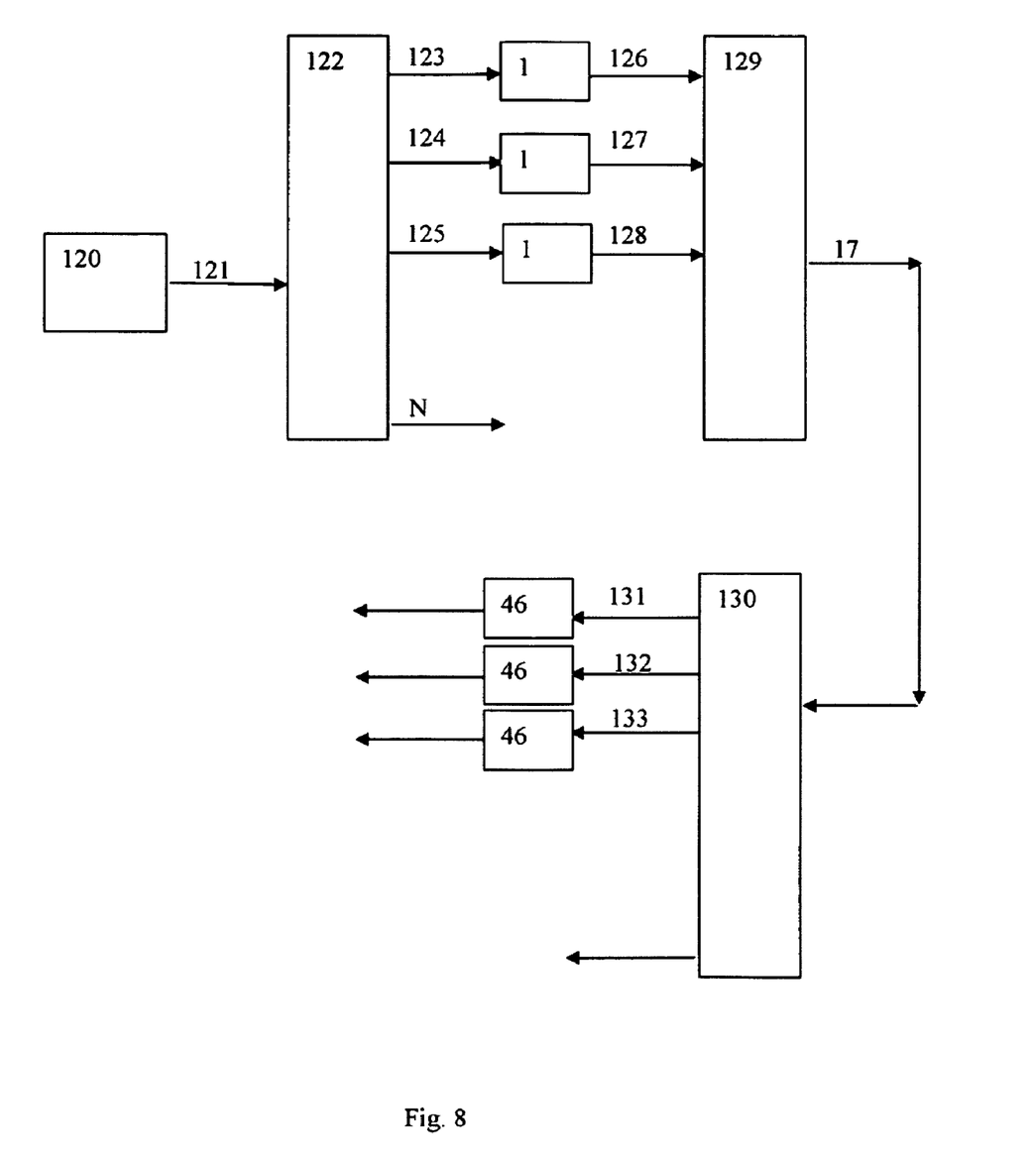
FIG. 8 A block diagram of a WDM communication link which employs OFDM QPSK transmission.

An embodiment of WDM transmission link which employs OFDM channel is shown in FIG. 8. A light source 120 generates radiation 121 having multiple wavelengths. In the preferred embodiment the light source 120 is an optical comb generator as disclosed in U.S. Pat. No. 7,123,800 by the same inventive entity, incorporated herein by reference. A demultiplexer 122 separates each tooth of the spectral comb. Optical beams 123-125 . . . N form a series of optical channels. Each channel is modulated by QPSK signal using OFDM encoding transmitters 1 as shown in FIG. 1. A multiplexer 129 combines all channels for the transmission via the optical link 17. At the receiving end each channel is separated by a multiplexer 130 and processed as shown in FIG. 2.

The foregoing description of a preferred embodiment of the invention has been presented for purposes of illustration and description. It is not intended to be exhaustive or to limit the invention to the precise form disclosed, and obviously many modifications and variations are possible in the light of the above teaching. The described embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical receiver, comprising:
a polarization beam splitter for receiving a polarization multiplexed optical beam with data encoded using orthogonal frequency division multiplexed (OFDM) format and splitting it into a first and a second beam;
a first optical hybrid for receiving the first beam and a first local oscillator beam;
a first set of photodetectors receiving output beams from the first optical hybrid and producing electrical signals;
a digital signal processing unit receiving the electrical signals, converting them into digital signals, transforming the digital signals into frequency domain, forming a set of spectral subcarriers each having its own digital frequency, recovering the polarization state of each spectral subcarrier, demodulating the encoded data, and outputting an information encoded in the optical beam with data;
wherein recovering the polarization of each spectral subcarrier comprises estimating the Jones Matrix for each sub-carrier frequency when the link starts operation and periodically during the receiver operation, and comparing the received signals with the ones expected with a current Jones Matrix and updating the Jones Matrix during receiver operation so to result in mitigation of PMD and improved system performance.

2. The receiver of claim 1, wherein the first optical hybrid is a 90-degrees optical hybrid.

3. The receiver of claim 2, the first optical hybrid comprising:
a first coupler coupled to a first input and producing at least a first and second output;
a second coupler coupled to a second input and producing at least a first and second output;
a third coupler coupled to the first output of the first coupler and to the first output of the second coupler;
a fourth coupler coupled to the second output of the first coupler and to the second output of the second coupler;
first and second crossing waveguides with an angle selected to minimize crosstalk and losses between the first and second cross waveguides, the first crossing waveguide connecting one of the first or second outputs from the first coupler with an input of the fourth coupler, the second crossing waveguide connecting one of the first or second outputs from the second coupler with an input of the third coupler; a first phase shifter coupled to the first and second waveguides, the first and second waveguides connecting one of the outputs of the first or second coupler and one of the inputs of the third or fourth couplers.

4. The receiver of claim 1, wherein the optical hybrid is a 120-degrees optical hybrid.

5. The receiver of claim 4, the optical hybrid comprising:
a coupler having three inputs and three outputs.

6. The receiver of claim 1, wherein the data is encoded using at least one of phase shift keying format, amplitude shift keying format, and frequency shift keying format.

7. The receiver of claim 1, wherein
the optical hybrid is an integrated device made of an electro-optical material or thermo-optical material or a combination of thereof.

8. The receiver of claim 1, wherein
the optical hybrid is formed as part of a single planar chip made of a semiconductor material or a ferroelectric material or a combination of thereof.

9. The receiver of claim 1, wherein
the coherent optical receiver is adapted for operation with the optical signal of two polarization states and recovers the polarization of each spectral subcarrier of the second beam.

10. The receiver of claim 1, further comprising:
a second optical hybrid for receiving the second beam and a second local oscillator beam;
a second set of photodetectors receiving output beams from the second optical hybrid and producing electrical signals; and
the digital signal processing unit receiving the electrical signals from the second optical hybrid, converting them into digital signals, transforming the digital signals into frequency domain, forming a set of spectral subcarriers each having its own digital frequency, recovering the polarization state of each spectral subcarrier, demodulating the encoded data, and outputting an information encoded in the optical beam with data.

11. The receiver of claim 1, wherein
the estimation of the Jones Matrix is based on a correlation analysis of a preamble transmission.

12. The receiver of claim 1, wherein
the Jones Matrix for each sub-carrier frequency when the link starts operation is also performed periodically during the receiver operation with a period P1.

13. The receiver of claim 12, wherein
the period P1 is from 10 ms to 1 s.

14. The receiver of claim 1, wherein
updating the Jones Matrix is performed periodically during the receiver operation with a period P2 from the range 1-50 ns.

15. The receiver of claim 1, wherein
the updating is based on multiplying the Jones Matrix by an error correction signal to adjust the Jones Matrix to changed transmission characteristics.

16. A system for a data transmission via an optical communication link, comprising:
a light source generating an optical beam, the optical beam being split into a first and a second beam having two different polarization states, the first beam being encoded in a first modulator driven by a first encoding signal from a first orthogonal frequency division multiplexed encoder, the first encoding signal comprising a set of digital spectral signals, each with different embedded data, and the second beam being encoded in a second modulator driven by a second encoding signal from a second orthogonal frequency division multiplexed encoder, the second encoding signal comprising a set of digital spectral signals, each with different embedded data;
the first and second encoded beams being combined by a polarization combiner to form a polarization multiplexed beam being transmitted via the optical link;
a polarization beam splitter receiving the polarization multiplexed beam and splitting it into a first and a second received beams having different polarization states;
a coherent receiver receiving the first received beam, the receiver mixing the first received beam with a first local oscillator beam coming from a local oscillator;
the receiver producing a set of output electrical signals;
a digital signal processing unit receiving the electrical signals, converting them into digital signals, transforming the digital signals into frequency domain, forming the set of spectral subcarrier each having its own digital frequency, recovering the polarization of each spectral subcarrier, demodulating the data encoded in each spectral subcarrier, and outputting an information encoded in the optical beam;

wherein recovering the polarization of each spectral subcarrier comprises estimating the Jones Matrix for each sub-carrier frequency when the link starts operation and periodically during the receiver operation, and comparing the received signals with the ones expected with a current Jones Matrix and updating the Jones Matrix during receiver operation so to result in mitigation of PMD and improved system performance.

17. The system of claim 16, wherein the coherent receiver is based on a 90-degrees optical hybrid.

18. The system of claim 16, wherein the coherent receiver is based on optical a 120-degrees optical hybrid.

19. The system of claim 16, wherein the modulator modulates the optical beam using a phase shift keying format.

20. The system of claim 16, wherein the optical link is a fiber or a free space link.

21. The system of claim 16, wherein
estimation of the Jones Matrix for each sub-carrier frequency is based on a correlation analysis of a preamble transmission.

22. A method of optical communication, comprising:
forming a first encoding signal in a first orthogonal frequency division multiplexed encoder, the first encoding signal comprising a set of digital spectral subcarriers, each with different embedded data, and forming a second encoding signal in a second orthogonal frequency division multiplexed encoder, the second encoding signal comprising a set of digital spectral subcarriers, each with different embedded data;

applying the first encoding signal to a first optical beam in a first modulator, and applying the second encoding signal to a second optical beam in a second modulator; combining the first modulated signal and the second modulated signal to form a polarization multiplexed optical signal; transmitting the polarization multiplexed optical signal to a coherent receiver via an optical link;

receiving the polarization multiplexed signal;

splitting the received signal by a polarization beam splitter into a first received beam and a second received beam having different polarization states;

mixing the first received signal with a first local oscillator signal in an optical hybrid;

converting output signals from the optical hybrid into electrical signals, digitizing the electrical signals, transforming the digital signals into frequency domain, forming the set of spectral subcarriers each having its own digital frequency, recovering the polarization of each spectral subcarrier, demodulating the data encoded in each spectral subcarrier, and outputting an information encoded in the optical beam;

wherein recovering the polarization of each spectral subcarrier comprises estimating the Jones Matrix for each sub-carrier frequency when the link starts operation and periodically during the receiver operation, and comparing the received signals with the ones expected with a current Jones Matrix and updating the Jones Matrix during receiver operation so to result in mitigation of PMD and improved system performance.

* * * * *